United States Patent [19]

Elser

[11] 4,232,586
[45] Nov. 11, 1980

[54] STEERING CONTROL VALVE FOR POWER BOOSTER STEERING MECHANISMS

[75] Inventor: Dieter Elser, Essingen-Lauterburg, Fed. Rep. of Germany

[73] Assignee: Zahnradfabrik Friedrichshafen AG, Friedrichshafen, Fed. Rep. of Germany

[21] Appl. No.: 37,031

[22] Filed: May 8, 1979

Related U.S. Application Data

[63] Continuation of Ser. No. 825,477, Aug. 17, 1977, abandoned.

[30] Foreign Application Priority Data

Aug. 20, 1976 [DE] Fed. Rep. of Germany ....... 2637458

[51] Int. Cl.³ .................... F15B 13/04; F16K 11/00
[52] U.S. Cl. ........................ 91/467; 91/470; 137/625.23; 137/625.24; 137/625.32
[58] Field of Search ............. 91/467, 470, 375 A, 91/375 R; 180/146, 147; 137/625.24, 625.31, 625.32, 625.23, 625.22; 251/309

[56] References Cited

U.S. PATENT DOCUMENTS

| | | | |
|---|---|---|---|
| 2,395,979 | 3/1946 | Tucker et al. | 91/375 |
| 2,946,348 | 7/1960 | North | 137/625.21 |
| 2,988,059 | 6/1961 | Wysong, Jr. | 91/375 A |
| 3,110,322 | 11/1963 | Bozoyan | 137/625.23 |
| 3,296,940 | 1/1967 | Eddy et al. | 137/625.24 X |
| 3,591,139 | 7/1971 | Bishop | 251/367 |
| 3,772,962 | 11/1973 | Suzuki | 91/375 A |

FOREIGN PATENT DOCUMENTS

| | | | |
|---|---|---|---|
| 881309 | 9/1971 | Canada | 137/625.23 |
| 958176 | 9/1949 | France | 91/375 |
| 1332115 | 6/1963 | France | 91/375 |
| 962794 | 7/1964 | United Kingdom | 91/467 |

Primary Examiner—Irwin C. Cohen
Attorney, Agent, or Firm—Zalkind & Shuster

[57] ABSTRACT

An otherwise conventional multi-way booster steering control rotary valve plug is provided with needle bearings at both ends of the grooved valve core, i.e., the rotary valve plug, in order to maintain it exactly centered radially within the coacting grooved valve sleeve i.e., a worm shaft in the present instant. This has been found to obviate heavy friction due to buildup of pressure on one side of the valve plug causing eccentricity within the valve worm shaft, such eccentricity causing these components to contact at the opposite side. The arrangement maintains radial clearance within very small limits to preclude significant oil leakage between the components and permits smooth rotary operation.

2 Claims, 3 Drawing Figures

STEERING CONTROL VALVE FOR POWER BOOSTER STEERING MECHANISMS

This application is a continuation of applicant's previous application Ser. No. 825,477, filed Aug. 17, 1977, and now abandoned.

The invention relates to booster steering rotary control valves of the kind shown in U.S. patent to A. E. Bishop, U.S. Pat. No. 3,591,139, July 6, 1971, in which the grooves in the coacting housing sleeve and rotary valve plug terminate short of the respective component ends, i.e., dead end grooves.

Leakage of pressure fluid between the rotary valve plug and its coacting housing sleeve building up at one side of the rotary plug forces the opposite side of the rotary valve plug into heavy frictional contact with the housing valve sleeve making it difficult to rotate the valve plug by manual force through the steering shaft. In prior art arrangements considerable clearance or play was designed into the mechanism so that the grooved valve plug would have a greater eccentric distance to travel before contacting the coacting grooved housing sleeve. However, such solution to the problem was merely a compromise since the increased radial play caused greater leakage and, therefore, greater risk of forced eccentricity of the rotary plug from true radial centering with increased chance of ultimately causing frictional engagement.

More specifically, in prior art arrangements oil has been found to leak from the ends of the longitudinal slots of the rotary plug and the surrounding coacting housing sleeve into the spaces existing between rotary plug and housing sleeve beyond the grooves. Any eccentricity occurring between the plug and housing sleeve due to mechanical steering forces effects leakage of oil on one side of the rotary plug, which oil, being under heavy pressure, unbalances radial forces on the rotary plug and thus increases eccentricity. This can occur up to the point where a hydraulic lock or binding due to frictional engagement of rotary plug and the housing sleeve occurs and seriously jeopardizes or makes impossible accurate steering movements.

Accordingly, the primary purpose of this invention is to produce a rotary plug and housing sleeve within the worm shaft in an arrangement that will ensure precision steering movements and avoid the binding due to hydraulic locking, as well as uncontrollable increases in friction between these two elements particularly where additional side forces on the valve plug are caused by steering and/or misalignment stresses.

It has been found that by arranging needle bearings at the ends of the rotary plug to support it in true radially centered alignment within the worm shaft, whereby the bearings are supported internally of the housing, the problems of the prior art are substantially overcome.

A detailed description of the invention now follows:

FIG. 2 is a cross-section on section line II—II of FIG. 1a.

Figure 1:
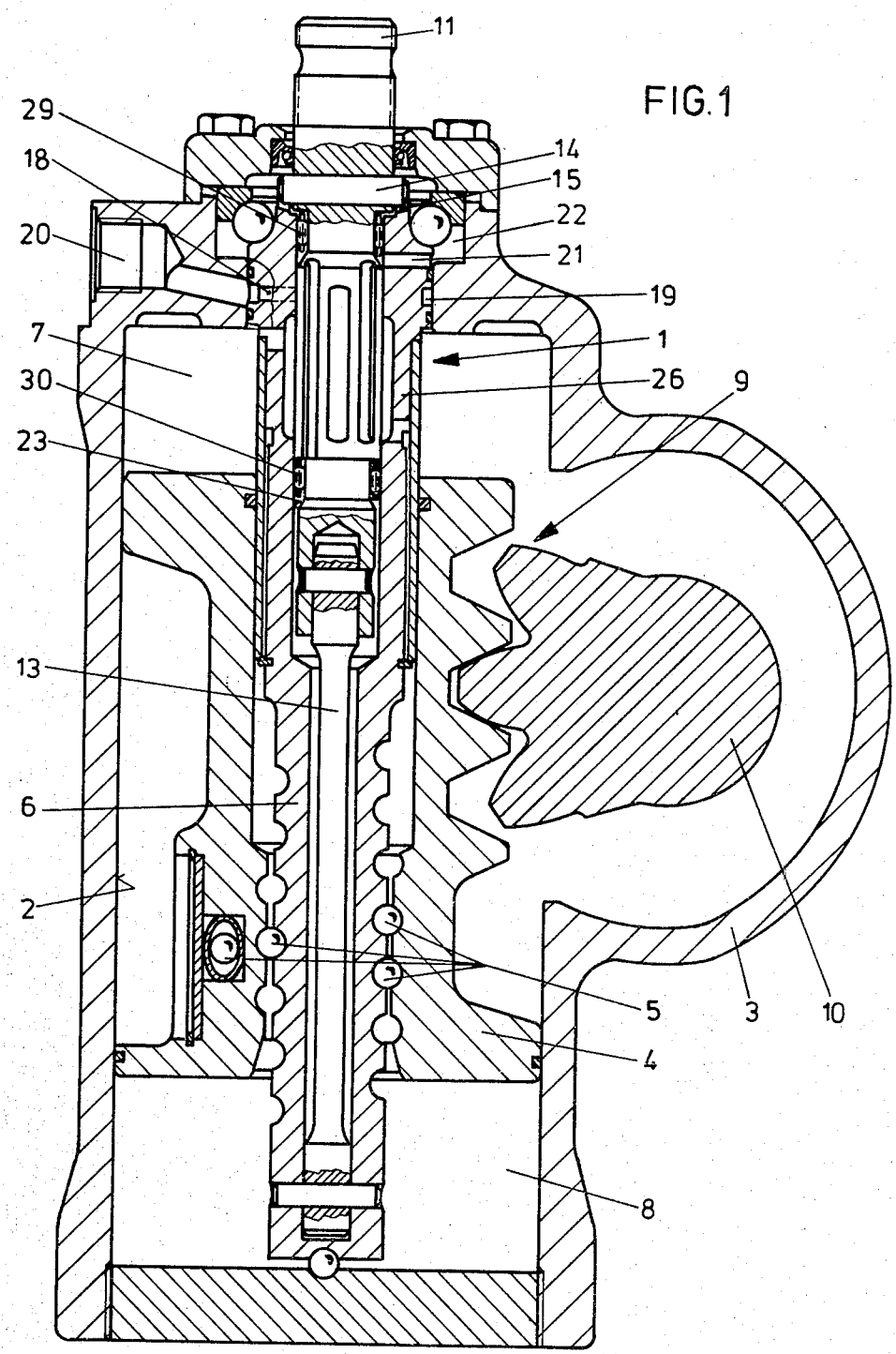
FIG. 1 is a longitudinal cross-section of a steering control valve and hydraulic motor together with a portion of the steering mechanism operated by the motor, all of generally known configuration except for the specific invention illustrated.

Referring to the drawing, particularly FIG. 1, the invention comprises a rotary valve plug 1, generally indicated by the arrow, for a conventional booster steering mechanism comprising the pressure boost cylinder 2 being integrated with a housing 3 for a portion of the steering mechanism. The usual reciprocal piston 4 is in the double acting cylinder 2 coacting with a steering worm shaft 6 in a central bore through the piston and which coacts therewith via the usual ball chain 5. Piston 4 divides cylinder 2 into the pressure chambers 7 and 8 and operates steering shaft 10 through the gear rack arrangement 9 in a well known manner. Thus, rotary movement of a steering wheel shaft via a connection pin 11 operates through worm shaft 6 to displace piston 4 via ball chain 5 effecting rotary movement of the steering mechanism shaft 10 via gear rack 9 via to operate a vehicle's wheels (not shown) for steering.

The usual torsion rod 13 is located between a rotary plug 12 of the steering control valve 1, which rod is connected with the steering wheel shaft connection pin 11 and the worm shaft 6, whereby torsion is introduced between rotary valve plug 12 and worm 6 upon rotation of the steering shaft. The relative torsion of the two members is conventionally limited by a pin 14 mounted in rotary plug 12 within a groove 15 located at the open end at the upper portion of worm 6. The torsion in rod 13 provides the conventional function for return motion of the rotary plug 12 to neutral position.

Figure 2:
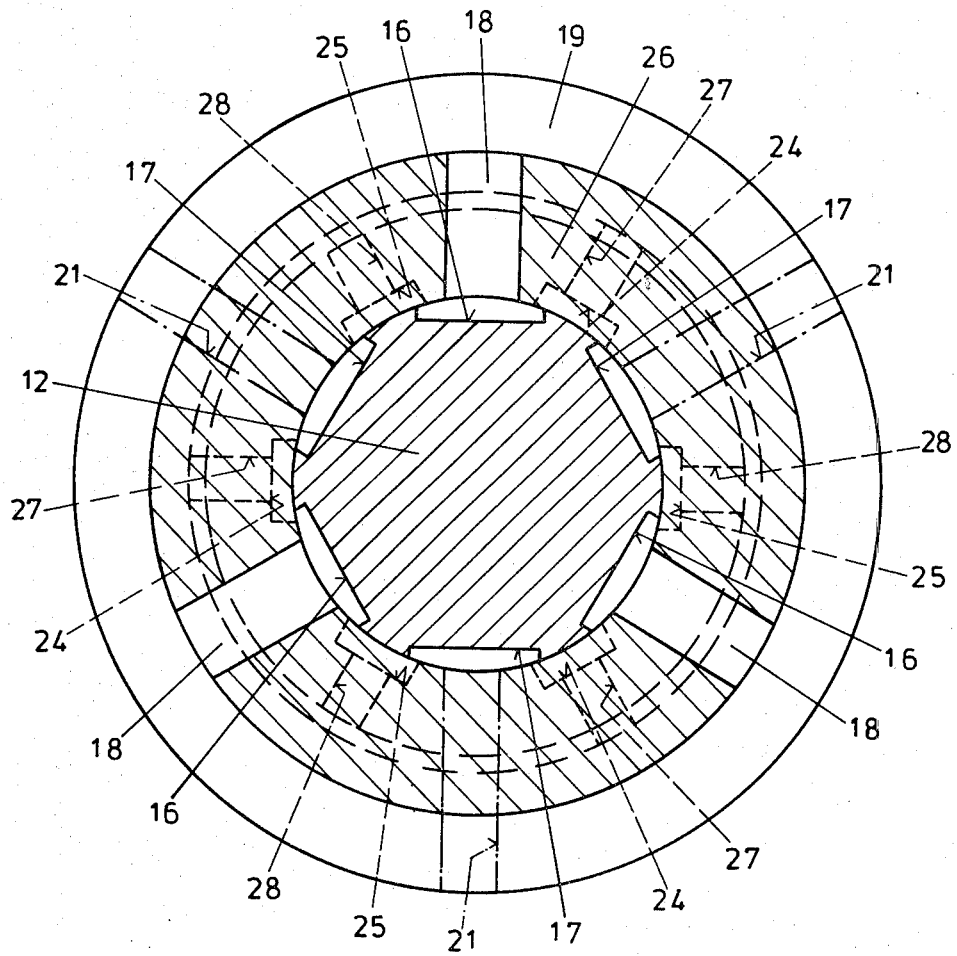

Referring particularly to FIG. 2, longitudinal flow grooves or slots such as the three grooves 16 and the three grooves 17 are provided peripherally spaced in the surface of the rotary valve plug 12 wherein grooves 16 connect through respective channels or bores 18 through worm shaft 6 and an annular groove 19 on the exterior of worm shaft 6, with an intake connection 20 for pressure oil supplied by a servo pump (not shown). Grooves 17 connect through respective channels 21 with an annular chamber 22 (FIG. 1) at the upper end of the motor housing for connection to an oil return line (not shown).

Figure 1A:
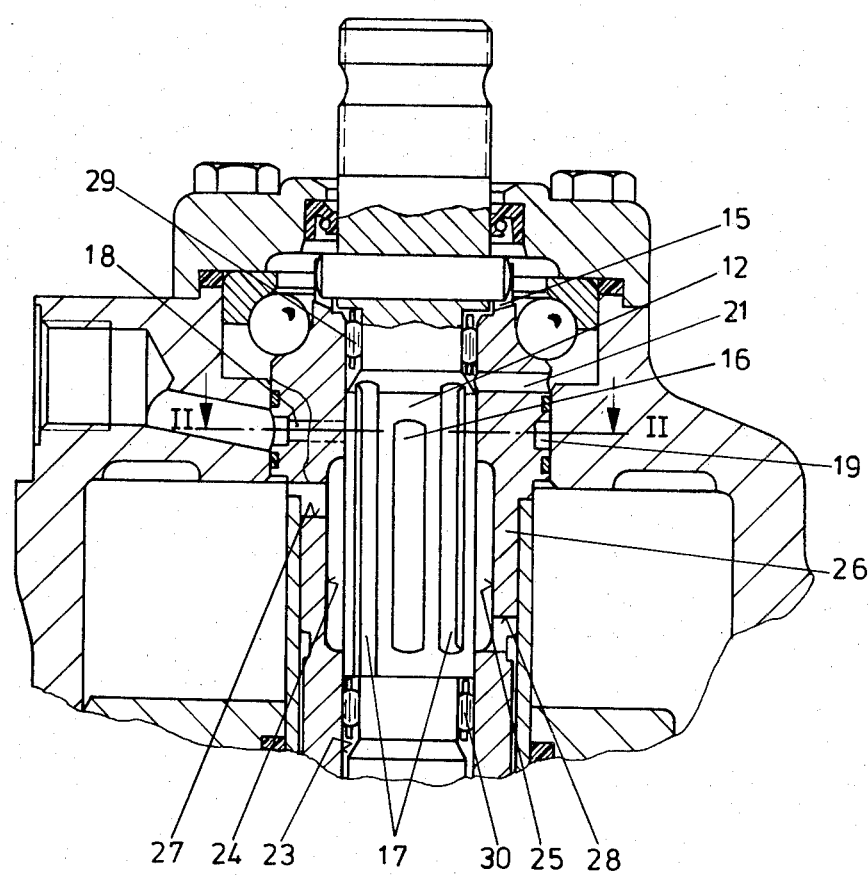
FIG. 1a is a portion of FIG. 1 showing the rotary valve invention in detail to a larger scale.

Three longitudinal grooves 24 and three longitudinal grooves 25 (FIG. 1A) are provided in the interior of worm shaft 6 which effects a valve sleeve 26 with a bore 23, the walls of which are provided with all such grooves. The grooves 24 and 25 coact with grooves 16 and 17 for oil flow control to and from the pressure chambers in a well understood manner. Specifically, bore 23 effects the conventional relatively stationary coacting valve sleeve 26 within worm shaft 6 for the rotary valve plug 12 during initial rotation of the plug for flow control. The grooves 24 and 25 in the valve sleeve and their respective channels are connectable alternately for control of the respective pressure chambers 7 or 8 via respective flow lines 27 or 28, depending upon direction of rotation of rotary plug 12 to effect a steering direction, likewise conventional.

Upon rotation of rotary valve plug 12 with respect to valve sleeve 26 grooves 16 and 17 and 24 and 25 have relative movement and control pressure flow to chamber 7 or 8 while exhausting the other chamber, all dependent upon direction of rotation and all in a conventional manner. Rotary valve plug 12 in neutral position effects connections between all overlapping grooves as seen in FIG. 2 for grooves 16, 17, 24, 25.

Ordinarily slight radial play is permitted between rotary valve plug 12 within worm shaft sleeve 26 to prevent any serious friction therebetween, but such play must be kept very small to prevent considerable losses through leakage which would otherwise occur.

In this invention rotary valve plug 12 is supported at both ends for rotation by anti-friction roller or needle bearings 29 and 30 (FIG. 1), which bearings may be of any suitable construction and which are carried within sleeve 26 supported by the walls of bore 23. These bearings encompass the ends of rotary plug 12 proximate the ends of the grooves as shown for precision radial spacing with respect to bore 23 and any play necessary to smoothly operate rotary plug 12 is uniformly distributed around its area and maintained in that manner. This is brought about because the outer diameter of the bearings 29 and 30 is made greater than the outer diameter of the rotary plug 12 by an amount of clearance chosen for smooth, frictionless operation, or substantially so.

The arrangement completely precludes any possibility of hydraulic i.e. binding due to pressure forces effected by leakage acting on a side of rotary plug 12 which would effect an eccentricity causing the plug to frictionally engage some portion of the walls of bore 23. A further advantage results in that rotary valve plug 12 is maintained in proper radial relationship in bore 23 even though there may be transverse forces acting on rotary valve plug 12 due to misalignment of other elements connected to it such as the steering shaft or torsion rod or mechanical steering forces. The invention thus makes it possible to construct a rotary valve plug for booster steering mechanisms which overcomes sidewise forces of either fluid pressure or mechanical forces wherein exact centering of the rotary valve plug is achieved with a predetermined exact degree of friction.

While slotted cage roller bearings are shown as preferred herein for support of the rotary plug, it will be understood that other types of bearings may be usable and that bearings of slotted cage or race type are within the spirit of the invention. Accordingly, the term "anti-friction" as found in the claims will be understood to refer to bearings of conventional movable element type normally secured between a sleeve and shaft in a pre-stressed condition.

In a practical application the needle rollers have a tolerance for desirable prestress and centering.

What is claimed is:

1. In a booster steering mechanism system including a boost cylinder and piston of the kind described, a rotary valve plug having dead end grooves and a worm shaft effecting a valve sleeve having interior dead end grooves to coact with said rotary valve plug dead end grooves for oil pressure flow control;

said rotary valve plug being rotative within a bore through said valve sleeve for flow control and being disposed to be subjected to sidewise forces of oil pressure and steering mechanism stresses;

an anti-friction roller bearing adjacent each end of the rotary valve plug proximate the ends of the dead end grooves therein and rotatively and fixedly supporting said rotary valve plug in said valve sleeve bore with a predetermined fixed radial clearance to permit smooth and uniform low resistance to rotation while minimizing oil leakage between the rotary valve plug and valve sleeve bore, whereby said sidewise forces acting on said rotary valve plug are resisted to preclude eccentricity thereof in said valve sleeve bore to thereby prevent frictional engagement of said rotary valve plug with said valve sleeve;

wherein said bearings comprise needle rollers in slotted cages arrayed in a circle which has an outer diameter predeterminedly larger than the outer diameter of the rotary valve plug to effect said predetermined clearance between said rotary valve plug and said valve sleeve bore; said needle rollers being radially supported continguously between the walls of said valve sleeve bore and said valve plug and providing the sole means of radial support for said valve plug.

* * * * *